US008091458B2

(12) United States Patent
Culling

(10) Patent No.: US 8,091,458 B2
(45) Date of Patent: Jan. 10, 2012

(54) CONTROL OF FOOD SLICING MACHINES

(75) Inventor: Alan Culling, Norwich (GB)

(73) Assignee: AEW Delford Systems Limited, Norwich (GB)

(*) Notice: Subject to any disclaimer, the term of this patent is extended or adjusted under 35 U.S.C. 154(b) by 951 days.

(21) Appl. No.: 12/027,498

(22) Filed: Feb. 7, 2008

(65) Prior Publication Data

US 2008/0196600 A1 Aug. 21, 2008

(30) Foreign Application Priority Data

Feb. 15, 2007 (GB) .................................. 0702950.7

(51) Int. Cl.
*B26D 7/06* (2006.01)
*B23Q 15/00* (2006.01)

(52) U.S. Cl. ................ 83/713; 83/62.1; 83/72; 99/491; 426/231

(58) Field of Classification Search .................. 83/62.1, 83/713, 72, 151, 370, 91, 89, 155, 278, 84, 83/86, 88, 90, 155.1, 93; 99/491; 426/231, 426/518

See application file for complete search history.

(56) References Cited

U.S. PATENT DOCUMENTS

| | | | | |
|---|---|---|---|---|
| 3,424,357 | A * | 1/1969 | Huffman et al. | 225/2 |
| 5,172,618 | A * | 12/1992 | Moriya et al. | 83/13 |
| 6,898,478 | B2 * | 5/2005 | Dick et al. | 700/171 |
| 2006/0107808 | A1 * | 5/2006 | Culling | 83/91 |

FOREIGN PATENT DOCUMENTS

| | | | |
|---|---|---|---|
| DE | 3010732 | A1 | 10/1981 |
| EP | 0733446 | A | 9/1996 |
| GB | 2386317 | A | 9/2003 |

OTHER PUBLICATIONS

Search report in EP 08250464.

* cited by examiner

*Primary Examiner* — Ghassem Alie
(74) *Attorney, Agent, or Firm* — Barnes & Thornburg LLP

(57) ABSTRACT

A food slicing machine is provided which is particularly suitable for slicing food products such as bacon, cheese or cooked meats. The machine has a slicing blade (1), and advancing apparatus (5, 6) operable to engage one end (13) of a food product (4) to be sliced and, on an advancing stroke, push the food product towards the slicing blade for slicing of the other end of the product. The machine includes a sensor (1) operative to produce a sensing signal representative of the position of said one end (13) of the product prior to engagement thereof by the advancing apparatus, and control circuitry for controlling the extent of a return stroke by the advancing apparatus in dependence upon the sensing signal.

6 Claims, 2 Drawing Sheets

CONTROL OF FOOD SLICING MACHINES

FIELD OF THE INVENTION

This invention relates to the control of food slicing machines, particularly machines which slice food products such as bacon, cheese or cooked meats.

BACKGROUND OF THE INVENTION

In known food slicing machines, gripper apparatus grips the food product and advances it through a slicing blade of the machine. The gripper apparatus then returns to its start position ready to engage the next food product to be sliced. Food products typically have irregular lengths. Slicing machines usually have an adjustable position for the gripper apparatus to return to. However, during a run of food products that position needs to be set to suit the maximum length of product to be sliced. Consequently, on products of shorter length the gripper apparatus undertakes a return stroke which is longer than necessary which increases the reload time.

SUMMARY OF THE INVENTION

According to one aspect of the invention there is provided a food slicing machine having a slicing blade, advancing apparatus mounted in the machine to undergo alternate advancing and return strokes, the advancing apparatus engaging one end of a food product to be sliced and, on an advancing stroke, pushing the food product towards the slicing blade for slicing of the other end of the product, the machine having a sensor operative to produce a sensing signal representative of the position of said one end of the product prior to engagement thereof by the advancing apparatus, and control circuitry for controlling the extent of the return stroke in dependence upon the sensing signal.

The sensor is preferably mounted on the machine so as to be moveable with the gripper apparatus, and the sensor may be mounted on an arm which supports the gripper apparatus in the machine.

The advancing apparatus preferably reciprocates over a bed on which a food product is supported during slicing, the machine also having a waiting area beside the bed for receiving the next food product to be sliced, the sensor being operative to scan the length of the next food product on a return stroke and to produce the sensing signal when the sensor detects said one end of the next food product.

In the preferred embodiment the sensor is a laser sensor and the sensing signal is an electrical signal which is conducted to the control circuitry.

According to another aspect of the invention there is provided a method of controlling the movement of advancing apparatus which undertakes alternate advancing and return strokes in a food slicing machine having a slicing blade, the advancing apparatus pushing the trailing end of a food product towards the slicing blade on an advancing stroke and then undergoing a return stroke ready to engage the trailing end of the next food product to be sliced, the method including predicting the location of the trailing end of the next food product and using this prediction to control the position at which the advancing apparatus commences its next advancing stroke.

The advancing apparatus may commence its next advancing stroke by a predetermined distance beyond the predicted location of the trailing end of the next food product, and this predicted distance is conveniently between 15 mm and 25 mm, most preferably about 20 mm.

The advancing apparatus preferably forms part of gripper apparatus which engages and grips said one end of the food product.

BRIEF DESCRIPTION OF THE DRAWINGS

The invention will now be further described, by way of example, with reference to the accompanying drawings in which.

DETAILED DESCRIPTION OF THE DRAWINGS

Figure 1:
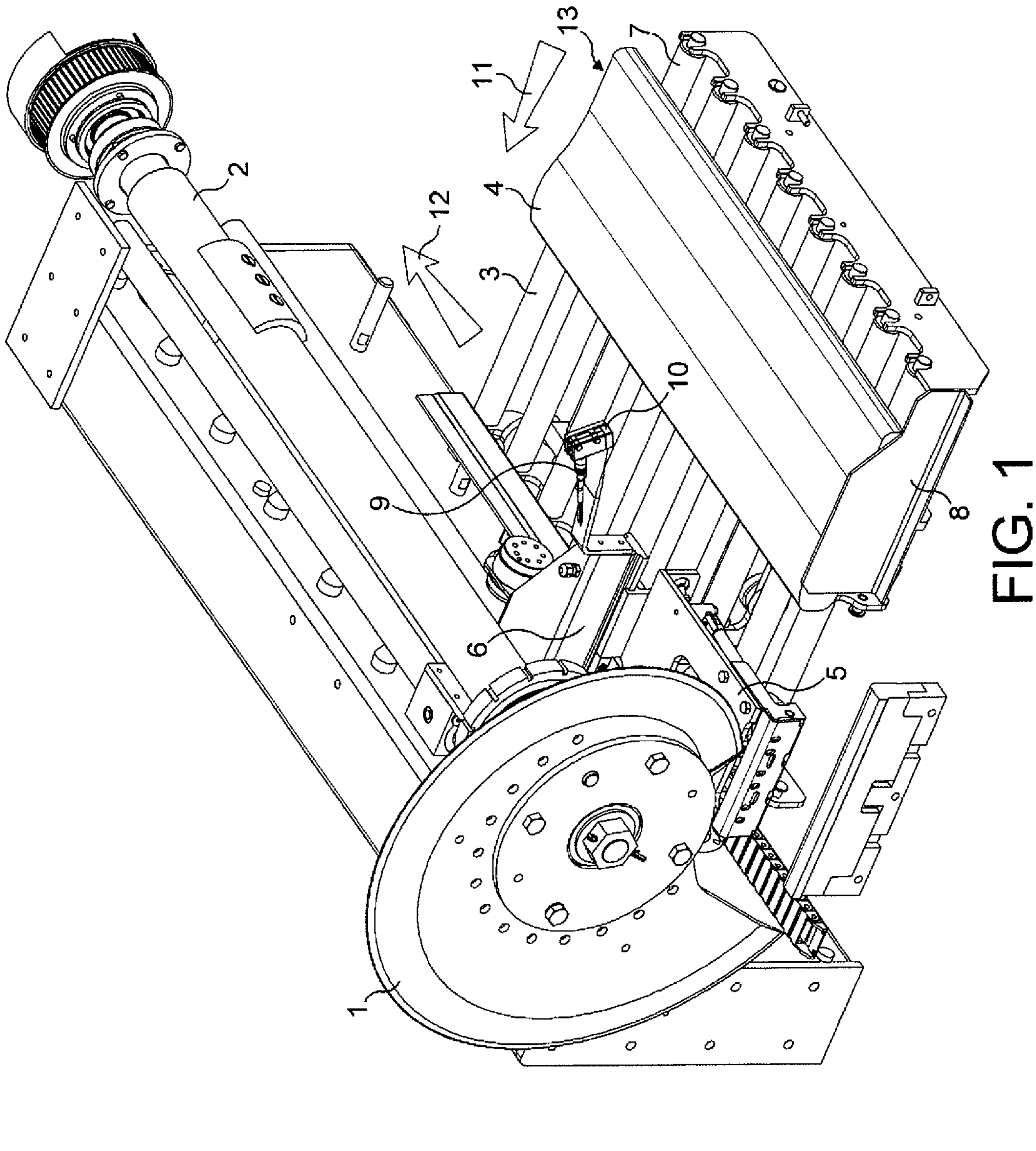
FIGS. 1 and 2 are isometric views of a food slicing machine according to the invention, FIG. 1 showing the machine with a gripper apparatus on a return stroke and FIG. 2 showing the machine with the gripper apparatus at the commencement of the next advancing stroke.

The machine has a slicing blade 1 rotatably driven by a drive shaft 2 positioned above a series of parallel rollers forming a bed 3 for supporting a food product, in this case a log of bacon 4, to be sliced. The bed 3 is inclined downwardly towards the blade 1.

A gripper 5 is carried by a horizontally projecting arm 6 which reciprocates above the bed 3, causing the gripper apparatus 5 to undertake alternate advancing and return strokes. Beside the bed 3 is a waiting area 7 defined by a further set of parallel rollers. The waiting area 7 is inclined to the horizontal at an angle matching the inclination of the bed 3, and an end plate 8 is positioned at the lower end of the waiting area 7. A bacon log 4 to be sliced is first placed on the waiting area 7, with the forward end of the log 4 resting on the plate 8, and this log remains on the waiting area 7 until slicing of the preceding log has been completed. This is the position illustrated in FIG. 1.

Figure 2:
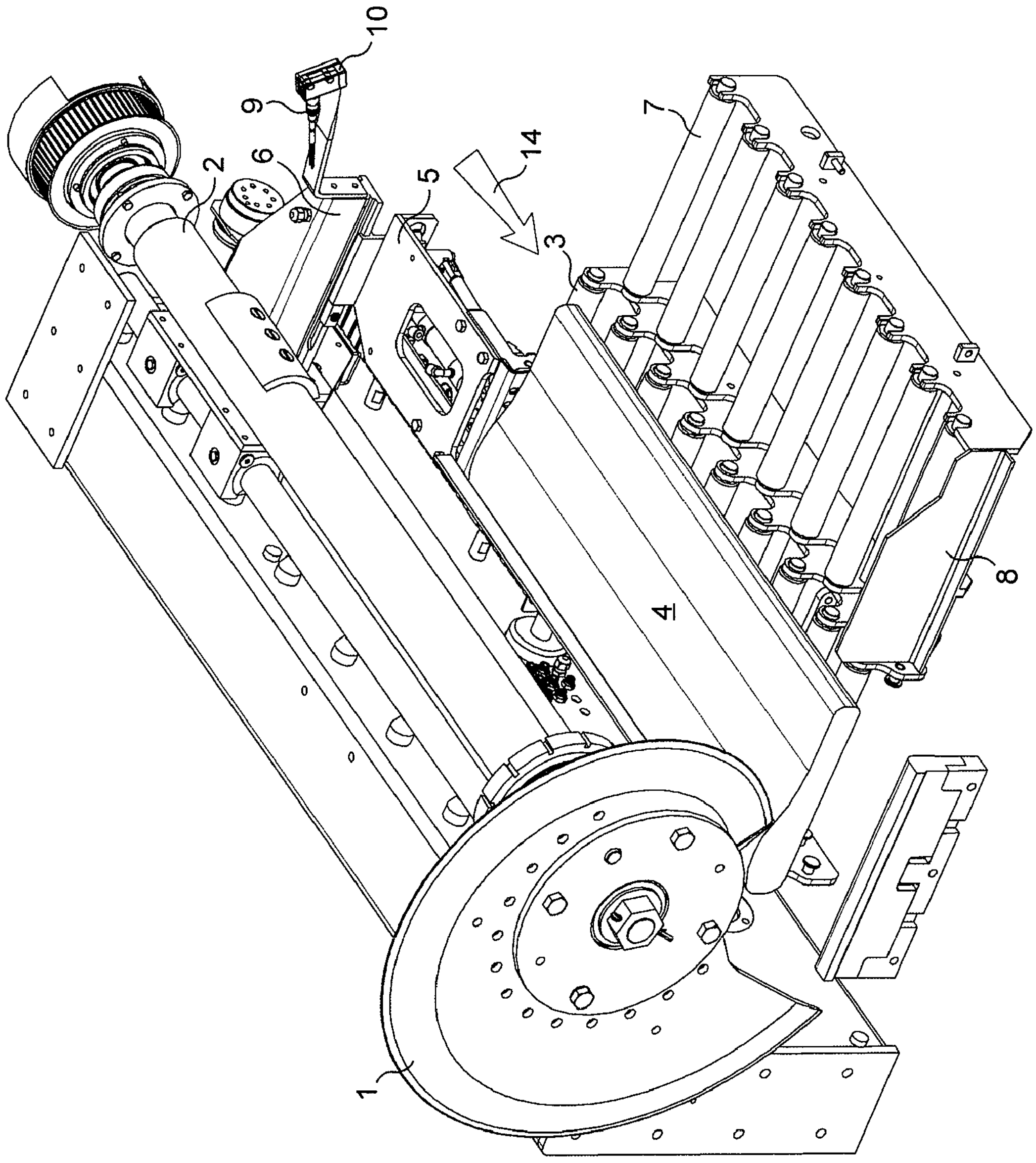

The arm 6 carries a projecting finger 9 the extremity of which has a laser sensor 10 positioned so as to scan the upper surface of the bacon log 4 as the gripper apparatus 5 undergoes a return stroke. The laser source 10 is electrically connected to control circuitry of the machine so that an electrical output signal from the laser source 10 controls the amplitude of the return stroke of the gripper apparatus in the following manner. In FIG. 1, the gripper apparatus is commencing its return stroke in the direction of arrow 12, and the sensor 10 is sensing the upper surface of the bacon log 4 as the sensor 10 moves over it. When the sensor 10 detects the trailing end 13 of the bacon log 4, the sensor 10 produces an electrical signal which causes the control circuitry to bring the gripper apparatus 5 to the end of its return or retracting stroke at a position about 20 mm beyond the predicted position of the trailing end of the log. Thus, when the log 4 is moved (arrow 11, FIG. 1) from the waiting area 7 onto the bed 3 by a loading arm (not shown), the gripper apparatus 5 is spaced 20 mm from the trailing end of the log and this is the position shown in FIG. 2. After this, the gripper apparatus 5 grasps the trailing end of the log 4 and commences its advancing stroke in the direction of arrow and pushes the log 4 towards the slicing blade 1. After slicing of the log 4, the gripper apparatus 5 undergoes a return stroke and the sensor 10 scans the next log on the waiting area 7.

The prediction of the position of the trailing end of the log avoids unnecessary movement of the gripper apparatus so that the bacon log can be lowered into the machine and slicing can commence with minimum wasted time and effort.

The invention claimed is:

1. A food slicing machine having:

a slicing blade;

advancing apparatus mounted in the machine to undergo alternate advancing and return strokes, the advancing apparatus being operable to engage one end of a food product to be sliced and, on an advancing stroke, push the food product towards the slicing blade for slicing of the other end of the product, the machine having a sensor operative to scan the length of the next food product on a return stroke to produce a sensing signal representative of the position of said one end of the product prior to engagement thereof by the advancing apparatus; and control circuitry configured so as to control the extent away from the slicing blade of the return stroke of the advancing apparatus in dependence upon the sensing signal.

2. A food slicing machine according to claim 1, wherein the sensor is mounted on the machine so as to be moveable with the advancing apparatus.

3. A food slicing machine according to claim 2, wherein the sensor is mounted on an arm which supports the advancing apparatus in the machine.

4. A food slicing machine according to claim 3, wherein the advancing apparatus reciprocates over a bed on which a food product is supported during slicing, the machine also having a waiting area beside the bed for receiving the next food product to be sliced, the sensor being operative to produce the sensing signal when the sensor detects said one end of the next food product.

5. A food slicing machine according to claim 1, wherein the sensor is a laser sensor.

6. A food slicing machine according to claim 1, wherein the advancing apparatus forms part of gripper apparatus which engages and grips said one end of the food product.

* * * * *